Aug. 8, 1967   H. N. JAMES ETAL   3,334,744
SIEVE CONSTRUCTION AND THE LIKE
Filed Sept. 22, 1965
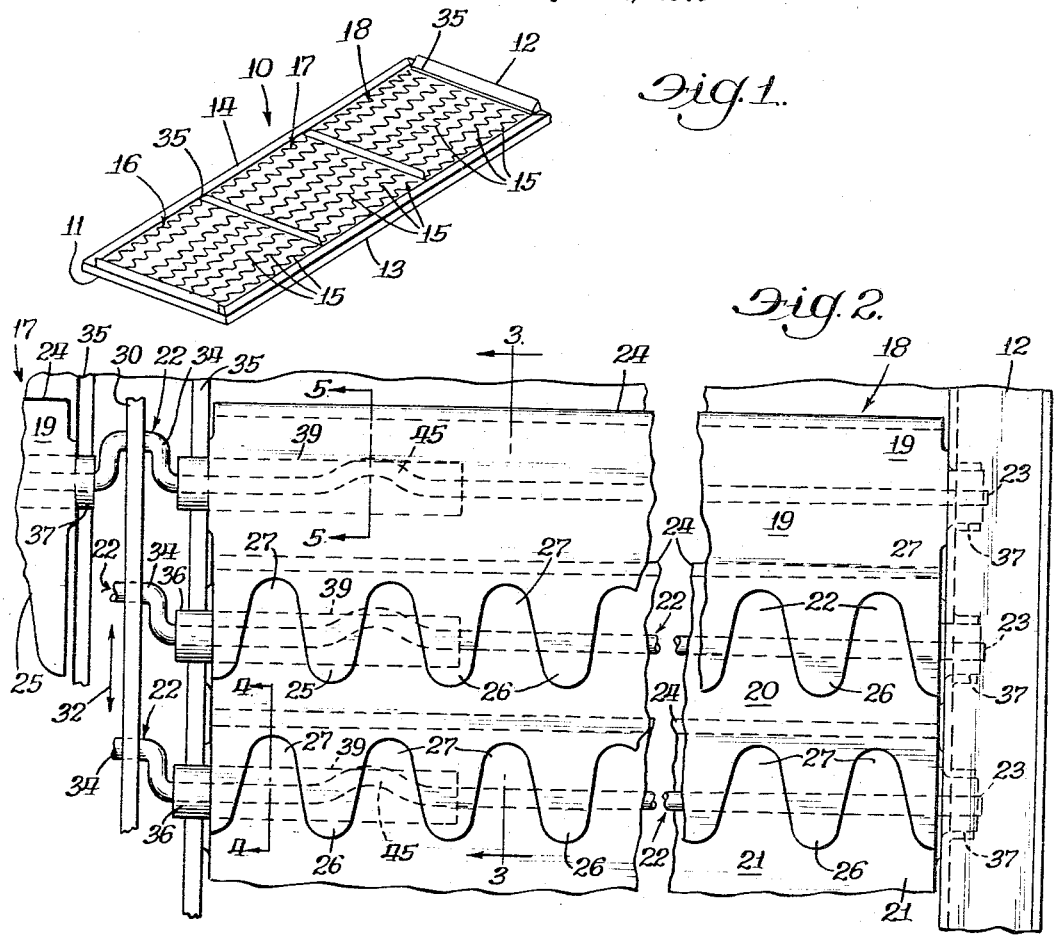
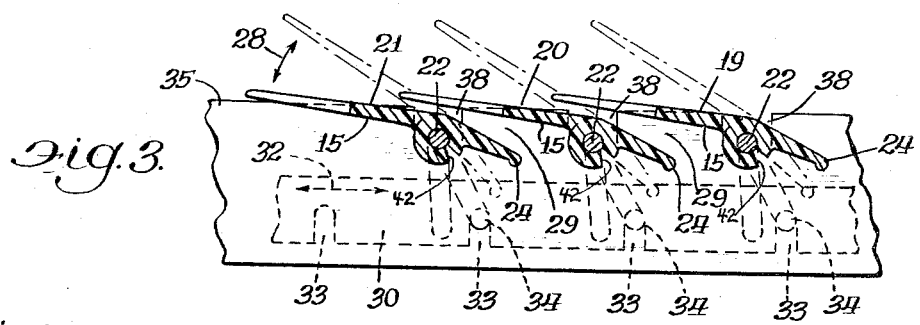
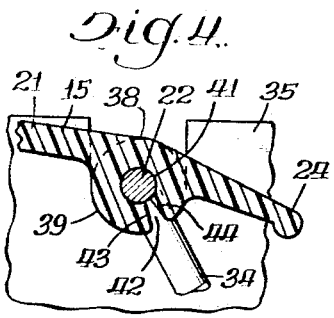
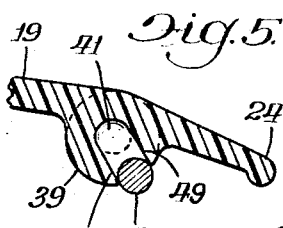
Inventors:
Howell N. James
Edward E. Collins

United States Patent Office

3,334,744
Patented Aug. 8, 1967

3,334,744
SIEVE CONSTRUCTION AND THE LIKE
Howell N. James and Edward C. Collins, Moline, Ill., assignors to International Harvester Company, a corporation of Delaware
Filed Sept. 22, 1965, Ser. No. 489,279
7 Claims. (Cl. 209—394)

The instant invention relates to grain sieves and the like. Particularly it relates to a sieve construction adapted for use in combines.

Most grain crops are harvested by detaching, severing or separation thereof from their natural sources by means which are carried in the forward end portions of harvesting devices. If a harvesting device is a combine, the thusly separated crop will be carried by conveying means into the interior of the housing comprising such combine for processing to separate and to recover the grain or seed portion of the crop from other vegetation. In the course of processing within the combine, seed or grain containing portions of the crop will be passed over agitated sieves which are adapted to permit therethrough seed or grain to fall by gravity for separation thereof from other crop vegetation.

A conventional combine sieve comprises a plurality of overlapping louvers which define therebetween sieve openings adapted downwardly therethrough to pass seed or grain. The louvers are adjustable to vary the size of the sieve openings to accommodate seed or grain of varying dimensions. The louvers of conventional grain sieves are fabricated of sheet metal and are rigidly secured to louver-carrying wires which extend longitudinally of the louvers and which are supported by sieve frame parts. The louvers are rocked for adjustment about axes formed by said wires, and such rocking causes erosion and eventual cutting of the wires at the positions where they are supported by the frame parts, with consequent problems incident thereto.

It is an object of the present invention to provide a combine grain sieve having tiltable louvers in which the tilting means are wires frictionally gripped in fabric integral with said louvers.

It is a further object of the present invention to provide a combine sieve construction having tiltable louvers in which the louver bearing parts are integral with the louvers.

It is an additional object of the invention to provide a combine grain sieve and the like having tiltable louvers and tilting means for said louvers which are snap-gripped thereon.

Another object of the invention is the provision of a sieve of the class indicated in which the louvers, louver bearings and the connection means for the louver tilt mechanism are integrally fabricated, preferably of plastic.

A yet further object of the invention is the provision of a combine sieve and the like, the weight of which is reducer substantially from that of comparable conventional devices, whereby the energy required to reciprocate the herein disclosed construction is substantially reduced over that required to reciprocate conventional sieves.

The foregoing and other objects, features and advantages of the present invention will become more apparent upon consideration of the following description and appended claims, when considered in conjunction with the accompanying drawings wherein the same reference character or. numeral refers to like or corresponding parts throughout the several views.

On the drawings:

FIG. 1 is a perspective view of a sieve embodying the instant invention.

FIG. 2 is an enlarged plan view of a section of the sieve illustrated in FIG. 1.

FIG. 3 is a partial vertical sectional view of the invention taken substantially on the line 3—3 of FIG. 2 and looking in the direction of the arrows.

FIG. 4 is a partial vertical sectional view taken substantially on the line 4—4 of FIG. 2 and looking in the direction of the arrows.

FIG. 5 is a partial vertical sectional view taken substantially on the line 5—5 of FIG. 2 and looking in the direction of the arrows.

Referring now more particularly to the drawings, in FIG. 1 there is shown a sieve adapted for use in a grain harvesting combine and the like by being mounted therein for reciprocation in a customary manner to shake seeds or grain from vegetation passing over the surface of the sieve.

The sieve comprises a frame generally designated 10 which is substantially rectangular in configuration. Frame 10 is defined by a forward frame member 14, a rear frame member 13, and a pair of side members 11 and 12. The sieve is characterized by a plurality of elongated louvers generally designated by numeral 15 and only some of which have been identified, louvers 15 having longitudinal axes which are disposed longitudinally of the frame members 13 and 14. As illustrated in FIG. 1, the louvers are arranged in a plurality of banks or sections 16, 17 and 18, with each louver disposed in overlapping relation to the louvers in the same bank next adjoining. That is to say, the louvers 19, 20 and 21 in each bank, bank 18 for example, are disposed in a manner such that the louver 19 overlaps the louver 20, and the louver 20 overlaps the louver 21, as clearly seen in FIG. 2.

Each of the louvers in each of the banks 16, 17 and 18 is aligned longitudinally of the frame 10, with a corresponding louver in each of the other banks. That is to say, for example, louver 19 in the bank 18 has its longitudinal axis in alignment longitudinally of the frame 10, with the longitudinal axes of louver 19 in the bank 17 and a corresponding louver in the bank 16. Similarly, and by way of further example, louver 20 in the bank 18 is in alignment longitudinally of the frame 10 with a pair of corresponding louvers in the banks 16 and 17.

In the instant illustration, each louver is aligned longitudinally of the frame 10 with a pair of other louvers in other banks, and each of the louvers is connected to the two louvers with which it is aligned by means of an elongated tie generally designated 22. Thereby, there are provided a plurality of ties 22 which extend longitudinally of the frame 10, each of said ties 22 traversing each of the banks 16, 17 and 18 and having its opposite end portions 23 projected beyond the outermost 16 and 18 of said banks about or into frame members 11 and 12, as illustrated partially to the right of FIG. 2.

As illustrated in the drawings, each of the louvers may have extending longitudinally thereof an elongated straight side 24 and an opposite escalloped or serrated side 25. The escalloped sides 25 are overlapping parts of the louvers, while the straight sides 24 are the overlapped sides. The escalloped side 25 of each of the louvers has a plurality of uniform projections or lobes 26, only some of which have been numbered in the drawings, adjacent of said projections being separated from each other by uniform recesses 27. The overlapping arrangement of the louvers and the disposition of the louver projections 26 and of the therebetween defined recesses 27 are conventional.

Each of the louvers is operated by the tie 22 to which it is connected. Thereby, the louvers may be selectively tilted or rocked clockwise and counterclockwise with respect to FIG. 3 in the direction of the arrow 28 to adjust the grain or seed passing gaps or openings 29 between the louvers. Such adjustability is conventional and is provided to control the character of particulate material to be passed through the sieve.

The rocking or tilting of louvers 15 is controlled by an elongated manually operable shift or tilt rod or bar 30 which is mounted on frame 10 in any suitable fashion, said shift bar 30 being disposed between a pair of the banks of louvers, herein being between the banks 18 and 19. The shift bar 30 extends transversely of the side walls 13 and 14 of the frame, said shift bar 30 being rockable or shiftable in alternate directions represented by the arrow 32 in FIGS. 2 and 3 to rock or shift the louvers 15 to the positions herein previously described and illustrated in FIG. 3.

To shift the louvers, the shift bar 30 has a plurality of downwardly opening recesses 33 which correspond to ties 22, respectively, and which are spaced longitudinally of said shift bar 30, as shown in dotted line in FIG. 3. Each of the ties 22 has an offset or crank portion 34, as illustrated in FIG. 2. There engages or is mounted in each of the recesses 33 the crank portion 34 of a respective or associated tie 22, as illustrated in FIGS. 2 and 3.

As the shift bar 30 is rocked or shifted to tilt the louvers 15, each of the ties 22 is rocked. The banks 16, 17 and 18 are separated from each other by frame parts or members in the form of louver bank partitions or dividers 35 which provide supports for the ties 22. In conventional sieves of the instant class, the ties are wires which are journalled in the louver bank dividers. In such conventional devices, frequent breakage of ties occurs by reason of erosion thereof produced by attrition between such ties and their dividers.

In accordance with the instant invention, such tie breakages are obviated. For that result, the louvers 15 are fabricated preferably from plastic rather than from sheet metal from which conventional louvers are fabricated. Each of the present louvers 15 has a pair of opposite end hub extensions, bearing bosses or journals 36 and 37 which are preferably fabricated of plastic and formed integral with the fabric of their louver 15, journals 36 and 37 of each of the louvers 15 being projected outwardly from opposite ends of their louvers and being disposed in alignment longitudinally thereof.

The journals 36 and 37 engage in opposed pairs of frame members for rockable support of their respective louvers. That is to say, with respect to the bank 18, for example, the journals 37 of each of the louvers 19, 20 and 21 are disposed in respective apertures or recesses in the end frame member 12 for rocking support of the bank 18 louvers at one end of each thereof. In positions opposite the frame member 12, the journals 36 of the louvers 19, 20 and 21 of the bank 18 rockably support their louvers by engagement in respective recesses 38 in the divider 35, as clearly seen in FIGS. 3 and 4. With reference to end bank 16, the louvers are rockably supported for adjustment in substantially the same manner as the louvers in the bank 18, however, with frame members reversed, inasmuch as the support provided by the left frame member 11 is at the left end of the louvers in the bank 16, whereas the support provided by the right frame member 12 is at the right end of the louvers in the bank 18. As regards the louvers in the middle bank 17, they are supported on opposite ends by journals 36 and 37 which engage in recesses 38 in an opposed pair of partitions or dividers 35.

As illustrated in the drawings, each of the ties 22 connects together and is connected to all of the louvers in a given line or row thereof extending longitudinally of frame 10. That is to say, in the illustrated embodiment, for example, each of the ties 22 will be secured to the louvers 19 in the banks 16, 17 and 18. To effectuate the connections, each of the louvers has a preferably integrally formed or molded elongated tie-gripping portion or ridge 39 which extends longitudinally and is disposed on the lower surface of its louver. In the embodiment of the invention illustrated, each ridge 39 is molded or formed integrally with and as an inward extension of an associated journal 36. The ridge 39 can extend the full length of the louver or as illustrated, only over a short portion of the louver.

A straight passage 41 is provided in journals 36 and 37 and associated portion 39 of each louver, as illustrated at 41 in FIGS. 4 and 5, to provide a path extending longitudinally of its associated louver from end to end thereof. The path in each louver is aligned longitudinally of the frame with the paths in the other louvers to which it is connected by a common tie 22. Entry to passages 41 may be gained through outwardly opening elongated slots 42 which extend the lengths of respective journals 36 and 37 and associated portion 39. The ties 22, which may be of conventional fabrication, such as wire, are engaged in the passages 41 of their respective louvers. To mount said ties in the louvers, said ties are pressed or snapped through slots 42 into passages 41. Inasmuch as the dimensions of the slots 42 are such that at their narrowest portions they are narrower than the diameters of the ties 22, said ties 22 once mounted in passages 41 will be retained therein normally thereafter. To facilitate introduction of the ties 22, which may be circular in cross section, into their respective passages 41, the walls 43 and 44 defining the slots 42 may be tapered toward each other as they extend inwardly toward the passages 41, as illustrated in FIG. 4.

A plurality of sections 45 of each of the ties 22 are offset, bent or otherwise distorted out of axial alignment in their respective tie. Each offset section corresponds to a louver and is engaged between the walls 48 and 49 of its respective portion 39. As can be best seen in FIGURE 5, walls 48 and 49 are parallel and spaced to snugly grip section 45 of the tie. Accordingly, each tie is considered keyed to its aligned louvers, and is retained from rotation independently thereof.

Therefore, when the shift bar 30 is rocked by means heretofore described, the louvers correspondingly simultaneously will be tilted, the ties being restrained from rotation independently thereof. Furthermore, by reason of the foregoing construction, the ties are protected from erosion by the journals 36 and 37 which provide protective hubs for said ties by disposition thereof in the frame parts which provide the journal bearings for said louvers.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a sieve construction and the like adapted for use on combines, said sieve construction having means defining a frame, said frame having a plurality of pairs of recesses formed therein, a plurality of elongated louvers rockably mounted within said frame and disposed in overlapping relationship transversely of the longitudinal axes of the louvers, said louvers having bosses projecting outwardly from each end thereof, said bosses being located within said recesses to permit the louvers to rock with respect to said frame, a plurality of elongated pivoting members extending longitudinally of said louvers and through said bosses, said pivoting members connected to said louvers such that they will be rocked as a unit, and louver shifting means connected to said pivoting members for rocking said louvers and pivoting members simultaneously on said bosses and adjusting the size of the openings therebetween.

2. The invention as set forth in claim 1 wherein said louvers have an escalloped edge defining grain passages.

3. A sieve construction and the like adapted for use on combines, said sieve construction comprising means defining a frame, said frame having a plurality of pairs of recesses formed therein, a plurality of louvers mounted within said frame and having elongated longitudinal axes and being disposed in overlapping relationship with each other transversely of said longitudinal axes, bosses formed integral and extending outwardly from each end of said louvers, said bosses adapted to be seated in the recesses formed in said frame to pivotally mount the louvers on the frame, longitudinally extending ridges formed integral with said louvers in alignment with said bosses, a longitudinal passage formed in said bosses and ridges, an elongated slot formed in said bosses and ridges providing an opening into said longitudinal passage, pivoting members adapted to be seated in said passages and engageable therein through said slots, said pivoting members having offset portions adapted to be disposed in said slots to prevent relative rotation between the louvers and their respective pivoting members, and louver shift means connected to said pivoting members for simultaneously tilting all of said louvers.

4. Invention defined in claim 3 characterized in that said louvers have upper and lower surfaces, and one longitudinal edge of said louvers being escalloped, said upper surface of each louver being overlapped by the escalloped edge of an adjacent louver, and said bosses and ridges protruding outwardly from said lower surfaces.

5. The device defined in claim 3 in which the louvers and parts integral therewith are fabricated from plastic having resilient characteristics, whereby said pivoting members can be snapped in axial position through said slots.

6. A louver for use on a separating sieve comprising a generally flat elongated strip of material, an integral boss projecting outwardly from each end of said elongated strip, said bosses having outer cylindrical surfaces and being adapted to function as means for pivotally mounting the louvers, integral ridges arranged longitudinally and aligned with said bosses projecting outwardly from a surface of said elongated strip, a longitudinal passage formed in said bosses and ridge, and an elongated slot formed in said bosses and ridge providing an opening into said longitudinal passage, said slot being narrower than said longitudinal passage.

7. The invention as defined in claim 6 in which the louvers and parts integral therewith are fabricated from plastic having resilient characteristics.

References Cited

UNITED STATES PATENTS

| | | | |
|---|---|---|---|
| 2,253,296 | 8/1941 | Holtzman | 209—394 |
| 2,740,525 | 4/1956 | Wehner | 209—399 |
| 3,194,397 | 7/1965 | Taege | 209—394 |

HARRY B. THORNTON, *Primary Examiner.*

T. R. MILES, *Assistant Examiner.*